United States Patent
Haverty et al.

(10) Patent No.: US 8,652,290 B2
(45) Date of Patent: Feb. 18, 2014

(54) SYSTEMS AND METHODS FOR MANUFACTURING COMPOSITE MATERIALS USING THERMOPLASTIC POLYMERS

(76) Inventors: David G. Haverty, Atlanta, GA (US); Thomas B. Peeler, Hoschton, GA (US)

( * ) Notice: Subject to any disclaimer, the term of this patent is extended or adjusted under 35 U.S.C. 154(b) by 1061 days.

(21) Appl. No.: 12/102,746

(22) Filed: Apr. 14, 2008

(65) Prior Publication Data

US 2008/0254307 A1 Oct. 16, 2008

Related U.S. Application Data

(60) Provisional application No. 60/923,349, filed on Apr. 13, 2007.

(51) Int. Cl.
*B32B 37/00* (2006.01)
*B29C 65/00* (2006.01)

(52) U.S. Cl.
USPC ........ 156/309.9; 156/164; 156/229; 156/322; 156/324

(58) Field of Classification Search
USPC ........ 156/163, 164, 229, 308.2, 308.4, 309.6, 156/309.9, 324, 322
See application file for complete search history.

(56) References Cited

U.S. PATENT DOCUMENTS

| | | | |
|---|---|---|---|
| 2,387,566 A * | 10/1945 | Custers | 156/499 |
| 3,419,447 A | 12/1968 | Hewitt | |
| 3,451,951 A * | 6/1969 | Akiyama et al. | 521/27 |
| 3,505,136 A | 4/1970 | Attwood | |
| 3,791,911 A * | 2/1974 | Yaeger et al. | 428/112 |
| 3,935,047 A * | 1/1976 | Shinomura | 156/163 |
| 4,022,863 A | 5/1977 | Karass et al. | |
| 4,158,711 A | 6/1979 | Gould | |
| 4,181,764 A * | 1/1980 | Totten | 428/155 |
| 4,274,662 A | 6/1981 | de Groot et al. | |
| 4,469,543 A * | 9/1984 | Segal et al. | 156/283 |
| 4,482,421 A | 11/1984 | Gurak | |
| 4,595,433 A | 6/1986 | Ford et al. | |
| 4,767,482 A | 8/1988 | Diez et al. | |
| 4,794,855 A * | 1/1989 | Okajima et al. | 100/154 |
| 4,892,768 A | 1/1990 | Cheung et al. | |

(Continued)

OTHER PUBLICATIONS

"1.3 Semicrystalline Thermoplastics", p. 4 from "Reinforced thermoplastics: composition, processing and applications" by Kelleher 1993.*

(Continued)

*Primary Examiner* — John Goff

(57) ABSTRACT

Apparatuses and methods for bonding together two or more layers of oriented polymer material or secondary material to form a rigid member. Two or more layers of material are initially restrained along an orientation axis to prevent contraction and loss of orientation. Then, the contact surfaces of each layer of material are heated to a temperature above the melting point for each respective material. Next, the heated contact surfaces are merged together, and pressure is applied to the merged contact surfaces to combine the layers. Once combined, the layers are cooled, and a rigid unitary member is formed.

19 Claims, 9 Drawing Sheets

(56) References Cited

U.S. PATENT DOCUMENTS

| | | | |
|---|---|---|---|
| 4,897,030 | A | 1/1990 | Vajitay |
| 5,336,526 | A | 8/1994 | Spoo et al. |
| 5,348,781 | A | 9/1994 | Koblella |
| 5,525,391 | A | 6/1996 | Dipede et al. |
| 5,695,698 | A | 12/1997 | Ajji et al. |
| 5,851,469 | A | 12/1998 | Muller et al. |
| 5,916,932 | A | 6/1999 | Nosker et al. |
| 6,376,563 | B2 | 4/2002 | Robinson et al. |
| 6,497,956 | B1 | 12/2002 | Phillips et al. |
| 6,749,709 | B1 | 6/2004 | Krishnawswamy et al. |

OTHER PUBLICATIONS

Yousefpour, A., Hojjati, M., Immarigeon, J-P, Fusion Bonding/Welding of Thermoplastics Composites, Journal of Thermoplastics Composites, Jul. 2004, pp. 303-341, vol. 17.

Zach, T., Lew, J., North, T.H., Woodhams, R.T., Joining of High Strength Oriented Polypropylene Using Electromagnetic Induction Bonding and Ultrasonic Welding, Materials Science and Technology, 1989, pp. 281-287, vol. 5.

Richardson, T., Industrial Plastics: Theory and Application, Cincinnati: South-Western Publishing Company, 1983, pp. 321-323.

* cited by examiner

SYSTEMS AND METHODS FOR MANUFACTURING COMPOSITE MATERIALS USING THERMOPLASTIC POLYMERS

CROSS REFERENCE TO RELATED APPLICATION

This application claims the benefit under 35 U.S.C. §119 (e) of U.S. Provisional Patent Application No. 60/923,349, filed Apr. 13, 2007, and entitled "A Method for Manufacturing Composite Structural Building Materials Using Oriented Polymers," which is incorporated herein by reference in its entirety.

FIELD OF THE INVENTION

Embodiments of the present invention relate generally to manufacturing composite materials from thermoplastic and other polymers. More particularly, embodiments of the present invention relate to systems, methods, and devices for manufacturing high-strength, resilient, and durable plastic members for use in applications requiring materials with high strength and rigidity characteristics.

BACKGROUND OF THE INVENTION

Today, plastics are used in a wide variety of applications. Virtually anything can be made from plastic, including eating and drinking utensils, toys, phones, appliances, packaging materials, sports equipment, and even clothing. Plastics are advantageous because they are typically lightweight, relatively durable, generally easy to mold and form, and are fairly inexpensive.

The full value of plastics, however, has yet to be realized for products and materials that require high strength and resiliency characteristics, such as building and construction materials, automobile frames, heavy machinery, and the like. Generally, underuse of plastics in these areas stems from the fact that while many plastics are relatively strong and durable, they typically do not exhibit the tremendous strength or rigidity characteristics required for these types of applications. For instance, traditional structural members, such as frames, supports, and I-beams, are generally constructed of wood, steel, concrete, or some other high-strength material. Automobile frames and parts are typically constructed of steel. Heavy machinery is almost always made of steel or some other metal.

All of these traditional materials, however, have inherent disadvantages. Wood, for example, may rot, split, warp, crack, or even be eaten by termites. Steel is extremely heavy, can be difficult to form and shape, and is very expensive. Concrete is not only heavy, but must be formed and shaped while in its liquid state, which naturally prevents numerous applications. Accordingly, high-strength plastic materials exhibiting the strength characteristics of wood or steel, without the drawbacks, would be greatly beneficial for use in construction, as well as other applications requiring high-strength materials.

One way the strength of plastics may be increased is by reinforcing the plastic with fillers, such as glass fibers or particles. When combined with glass or a similar filler material, the plastic becomes significantly stiffer and more durable. However, even with added strength, reinforced plastic lacks the strength and resiliency required for many applications, such as those described above. Additionally, the combining process is intricate and expensive, further prohibiting its widespread use.

Another way in which the strength of plastics may be increased is through "orientation". Orientation (or "molecular orientation") generally refers to the alignment of molecules within a particular piece of plastic material. As the molecules are aligned, the orientation and crystalline structure of the polymer chains within the piece of plastic increases. The degree of the orientation and crystallization dictates the strength of the plastic. Orientation is typically achieved by the heated stretching of a length of plastic material in a temperature range between the glass transition temperature (Tg) and the melt temperature (Tm). For instance, conventional drawing processes may be used to orient the plastic. Other conventional processes, such as "calendering" and compression roll drawing, may also be used to stretch and orient the material. Accordingly, as the plastic is oriented and stretched, the polymer chains align within the plastic, and the overall strength of the plastic increases correspondingly.

Because of the nature of the orientation process (heating, stretching, etc.), a thermoplastic is generally used. A thermoplastic (as compared to a thermoset or thermosetting plastic) is a plastic that melts when heated and hardens to a rigid state when cooled sufficiently, thermoplastics are remoldable and weldable when heat is added, whereas thermosetting plastics cannot be welded or remolded when heated, they simply burn instead. Accordingly, thermoplastics may be recycled and reused several times. Examples of thermoplastics include polyethylene terephthalate (PET), polypropylene, polybutylene terephthalate (PBT), and other like materials.

When the plastic is oriented, its cross-sectional area is greatly reduced. A conventional orientation process will stretch the polymer chains within the plastic to 3-5 times their normal length, resulting in a strength of 3-5 times that of pre-oriented plastic. However, this stretching results in a corresponding loss in cross-sectional area of 3-5 times the original area of the material. Thus, although the plastic becomes much stronger when oriented, it also becomes very thin. Existing machines and processes are incapable of orienting thick sheets of material to arrive at large cross-sectional areas because the machines simply cannot handle the immense stress and force required to stretch the material around rollers or pull it via some other mechanism. Thus, while a highly-oriented length of PET, for example, may exhibit a tensile strength similar to that of steel, a single sheet or layer of the material is essentially only useful for straps, ties, or other similar products, as opposed to thick, rigid members, because of its extremely thin cross-sectional area.

However, if several oriented sheets of plastic material are combined in some manner (without disturbing the molecular orientation of the sheets), then the combination retains the tensile strength and resiliency properties caused by orientation, but also adds the increased compression strength and rigidity characteristic of a thicker member. At present, there are a few known processes for combining oriented layers of thermoplastic material, such as rolling several sheets of material around a heated roller to melt the sheets together. However, none of the known processes are capable of combining thick layers (i.e. a thickness greater than or equal to that of typical film, which is in the range of about 0.002 inch to 0.015 inch). An inherent characteristic of oriented thermoplastic is that when it is reheated, it tends to shrink back to its original length. This shrinkage produces a large constriction force as the polymer chains attempt to contract. As layers become thicker, the force exerted during shrinkage becomes larger, to the point where the forces are unmanageable. Thus, conventional processes cannot adequately combine several thick layers of oriented plastic to form a rigid, high-strength member.

Additionally, even though conventional processes can combine very thin sheets (less than 0.010 inch thick), because the sheets are so thin, the entire sheet becomes melted during heating. This melting causes the polymer chains within the material to shrink and distort, which in turn causes the sheet to lose the strength and resiliency characteristics it gained during orientation. Thus, the combined material will not have the desired strength characteristics needed for certain applications. Further, because the sheets are so thin, it would require a great number of sheets to build enough thickness to produce a member of adequate thickness for structural or industrial use.

Therefore, there is a long-felt but unresolved need in the art for systems and methods of creating high-strength plastic material that is durable, relatively inexpensive, and easy to produce. Specifically, there is a need for a machine or process that combines thick layers of highly-oriented thermoplastics to form a rigid, unitary, high-strength member. Moreover, there is a need for a machine or process that combines thick layers of highly-oriented thermoplastics with thick layers of other types of filler material. Alternatively, there is a further need for a machine or process that is capable of orienting plastic materials of varying shapes with large cross-sectional areas.

BRIEF SUMMARY OF THE INVENTION

Briefly described, and according to one embodiment, the present invention is directed towards an apparatus for laminating together two or more layers of material. The apparatus includes two or more sets of drive rollers for advancing the layers of material along a predetermined path through the apparatus. Each set of drive rollers generally includes at least two drive rollers positioned on opposing sides of the material to not only advance the material through the apparatus, but also to restrain the material from contracting during subsequent heating. The apparatus also includes at least one heating element for melting each contact surface of the layers of material, wherein each contact surface is melted to a temperature greater than the melting point of each respective layer of material. Additionally, the apparatus comprises a bonding component for pinching together the heated layers of material such that the contact surface of one melted layer is fused with a melted contact surface of another melted layer. Once fused, the contact surfaces are cooled and hardened to form a solid unitary member from the two or more layers of material.

According to one aspect of the embodiment, each contact surface comprises the outer 0.012 inch or less of the thickness of each layer of material. Or, stated differently, each contact surface comprises the outer 20% or less of the thickness of each layer of material. Further, in one aspect, the thickness of each layer of material is greater than or equal to 0.010 inch.

According to another aspect, the drive rollers apply a clamping force of greater than or equal to 1,000 psi on the layers of material while simultaneously advancing the layers of material through the apparatus.

According to an additional aspect, the bonding component comprises at least two rollers for receiving the two or more heated layers of material and applying pressure to the layers of material as the layers pass between the rollers. In one aspect, the pressure applied by the bonding component is between about 5 and 75 psi.

According to yet another aspect, the heating element is located 3 inches or less from the point where the heated layers of material are pinched together within the bonding component. In one aspect, the heating element is a series of heaters for gradually heating and melting the contact surfaces of the layers of material. Further, the heaters may be any general heating mechanism, such as an infra-red heater, an electromagnetic heat source, hot air, microwave heat, induction plate welding, friction welding, hot blades, an electric heat component, lasers, or flame. In another aspect, the contact surfaces of the layers of material are pretreated with a corona or plasma treatment before the contact surfaces are melted by the heating/element.

According to still another aspect, the apparatus further includes one or more feed rollers for feeding the layers of material into the apparatus. In one aspect, at least one of the layers of material is oriented semi-crystalline thermoplastic, such polyethylene terephthalate (PET), recycled PET, or polypropylene (PP). In some aspects, the oriented semi-crystalline thermoplastic is combined with a wood-filled composite. In another aspect, at least one of the layers of material is a secondary material, such as polycarbonate, acrylic, acrylonitrile butadiene styrene (ABS), polyvinyl chloride (PVC), polystyrene, foams, or other amorphous resins. In one aspect, the secondary material is combined with a filler material, such as flame retardant, wood, blowing agent, glass, ultraviolet additives, or color additives.

According to a further aspect, the fused contact surfaces are cooled and hardened by a cooling agent, such as ambient air, water, refrigeration, or cryogenics.

According to another embodiment, the present invention is directed towards a method for bonding together two or more layers of oriented polymer material to form a rigid unitary member. First, the layers of polymer material are restrained along at least one orientation axis of the layers to prevent shrinkage of the material during processing. Next, each respective contact surface of the restrained layers of material are heated to a temperature greater than the melting point of the material. The contact surfaces are then merged, and pressure is applied to the merged surfaces to combine the layers of material into a rigid unitary member.

According to one aspect of the embodiment, each contact surface is the outer 0.012 inch or less of the thickness of each layer of oriented polymer material. Stated differently, each contact surface is the outer 20% or less of the thickness of each layer of material. In one aspect, the thickness of each layer of material is greater than or equal to 0.010 inch.

According to another aspect, the oriented polymer material is a semi-crystalline thermoplastic, such as polyethylene terephthalate (PET), recycled PET, and polypropylene (PP). In some aspects, the oriented semi-crystalline thermoplastic is combined with a wood-filled composite.

According to a further aspect of the embodiment, the pressure applied to the merged contact surfaces is between about 5 and 75 psi.

According to yet another aspect, each respective contact surface of the layers of oriented polymer material is pretreated with a corona or plasma treatment before the contact surfaces are heated to increase the adhesive properties of the layers.

According to still another aspect, each respective contact surface melts to a semi-liquid state during heating. In one aspect, the respective contact surfaces are merged immediately after heating before the surfaces begin to recrystallize.

According to an additional aspect, the merged contact surfaces are cooled by a cooling agent such as ambient air, water, refrigeration, or cryogenics.

According to another aspect of the embodiment, the rigid unitary member is encased in a protective jacket. In one aspect, the protective jacket is made of polyethylene, polypropylene (PP), or PET. In some aspects, the jacket material is combined with a filler material such as flame retardant, wood, blowing agent, glass, ultraviolet additives, or color additives.

According to an additional aspect, an embodiment of the present invention comprises a rigid unitary member manufactured according to the above-described method.

According to yet a further embodiment, the present invention is directed towards a rigid member comprising two or more layers of axially oriented polymer material, wherein the two or more layers of oriented polymer material are welded together at a contact surface along an axis line of orientation within the layers of material, and wherein the layers retain at least 50% of their original orientation during welding.

According to one aspect, orientation within the rigid member is defined by the degree of molecular alignment within the oriented polymer material. In another aspect, the layers of axially oriented polymer material are comprised of a semi-crystalline thermoplastic such as polyethylene terephthalate (PET), recycled PET, or polypropylene (PP). In some aspects, the oriented semi-crystalline thermoplastic is combined with a wood-filled composite.

These and other embodiments and aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1A:
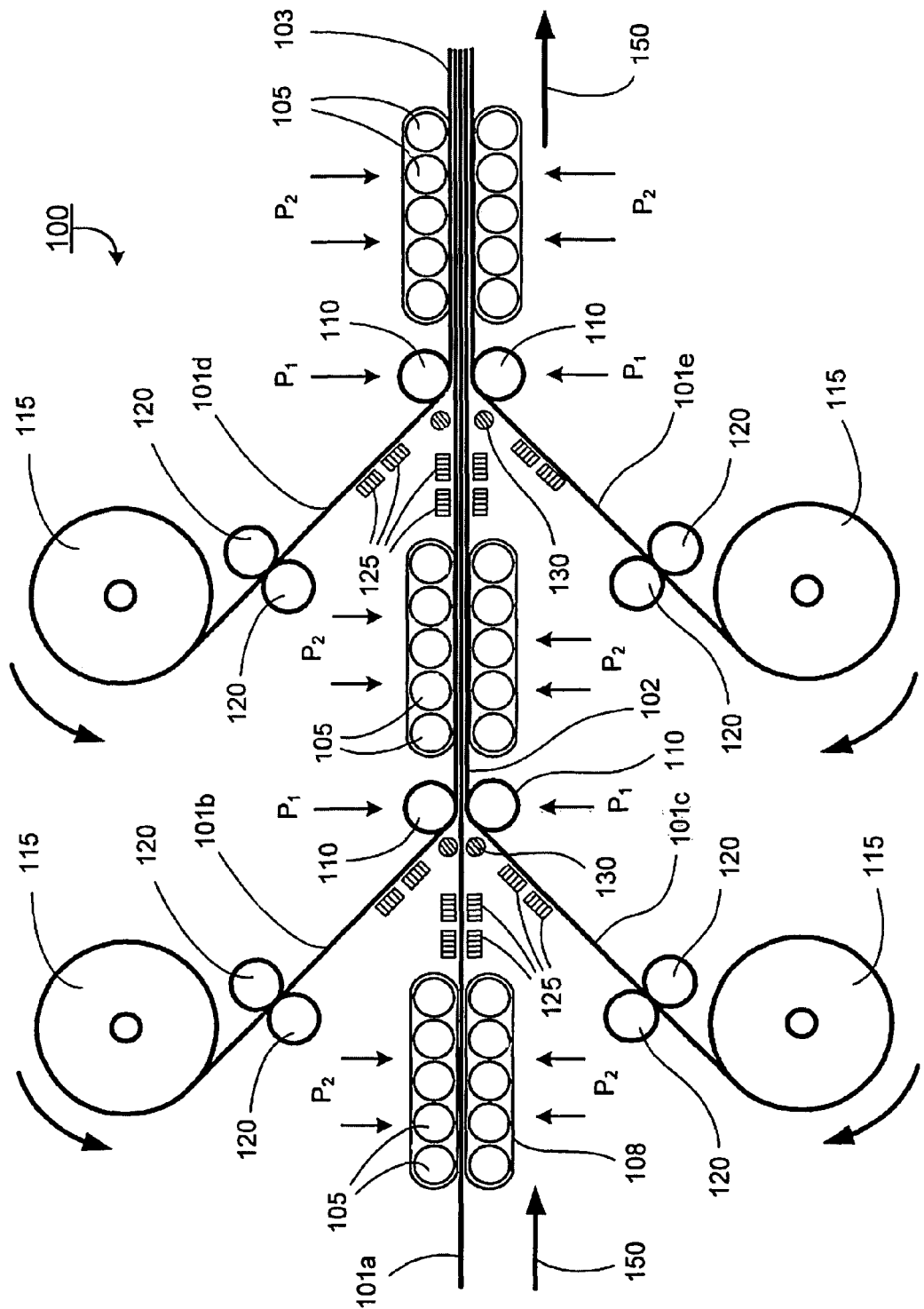
FIGS. 1A-1C are side views of a continuous lamination device for combining a plurality of layers of oriented thermoplastic or secondary material to form a solid, unitary member according to embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatuses, systems, and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

In general, the extrusion and orientation of sheets or layers of plastic material is fairly well known. Typically, a multitude of plastic pellets, either in recycled or virgin form, are extruded into a thin sheet or strap. Once extruded, the sheet or strap is elongated and strengthened via an orientation process, which is usually accomplished through a drawing mechanism. Generally, the extruded and oriented sheet is made of a thermoplastic material, such as polyethylene terephthalate (PET), polypropylene, polybutylene terephthalate (PBT), or other like materials. While it will be understood to one of ordinary skill in the art that virtually any thermoplastic material may be used by embodiments of the present invention, PET is preferable.

PET is a thermoplastic polymer resin of the polyester family. Certain forms of PET, as well as other thermoplastics, will crystallize to a certain extent, and thus are often referred to as "semi-crystalline" materials. The strength of oriented PET makes it particularly well-suited for applications requiring high-strength, resilient materials. However, as mentioned above, PET must be significantly stretched to obtain optimal polymer chain alignment and resulting strength, and tremendous force must be used to orient the material. Thus, the oriented PET material is generally only available in thin sheet or narrow strap form because thicker materials are too unwieldy and exert too great a reactant force when stretched to be oriented sufficiently by current processes. Thus, the combination of these oriented sheets or straps into a thicker, unitary member, without sacrificing the strength caused by the orientation process, is highly beneficial for use in many industrial applications.

Referring now to the drawings, FIG. 1A illustrates a side view of a continuous lamination device 100 for combining a plurality of semi-crystalline thermoplastic sheets, or combining one or more thermoplastic sheets with one or more sheets of a secondary material, to form a solid, unitary member according to an embodiment of the present invention. The continuous lamination device 100 includes a plurality of drive rollers 105, bonding or nip rollers 110, feed rollers 115, and tension rollers 120. The lamination device 100 also includes a plurality of pre-heaters 125 and final heaters 130. When in use, a plurality of sheets of material 101a-e are fed through the lamination device 100 along a predetermined path indicated by arrows 150 to form a solid member.

For purposes of this application, "lamination" simply refers to the process of combining two or more composite layers of material to form one piece. As will be understood by one having ordinary skill in the art, each of the layers of material 101a-e may be comprised of a different type of material as compared to the other layers. For instance, the continuous lamination device 100 may combine alternating layers of oriented thermoplastics with layers of secondary material, such as polycarbonate, acrylic, acrylonitrile butadiene styrene (ABS), polyvinyl chloride (PVC), polystyrene, or other similar materials (discussed in greater detail below). However, the process according to the embodiment shown in FIG. 1A will first be described wherein all sheets 101a-e are comprised of oriented thermoplastic material.

Initially, a first sheet of oriented thermoplastic material 101a is fed through the lamination device 100 along the path indicated by arrow 150. The thickness of the oriented thermoplastic sheets 101a-e is approximately between 0.010 inch to 0.50 inch, but preferably about 0.040 inch. The width of the sheet may vary greatly depending upon the application, and is really only limited by the width of the lamination device 100 itself.

When the sheet of oriented thermoplastic 101a first enters the continuous lamination device 100, it is advanced forward by a set of drive rollers 105. The drive rollers 105, as well as the bonding rollers 110 and tension rollers 120, may be comprised of steel, urethane, or other similar high-strength material. While the drive rollers 105 are shown in FIG. 1A as sets of five rollers each surrounded by a track 108, one having skill in the art will understand that other embodiments may employ varying numbers of rollers for each set, including a singular roller on each side of the sheet 101a to progress and hold the sheet as it moves through the lamination device 100. Additionally, while a track 108 is shown in FIG. 1A as surrounding each set of drive rollers 105, one having ordinary skill will understand that a track 108 is not necessary to sufficiently drive and hold the sheet 101a during processing.

Still referring to FIG. 1A, after the sheet 101a is advanced forward through the drive rollers 105, the sheet is combined with (laminated to) sheets 101b and 101c. Feed rollers 115 supply the sheets of material 101b and 101c for lamination to sheet 101a. Sheets 101b and 101c are fed from the feed rollers 115 through a set of tension rollers 120 to hold the sheets from contracting and relaxing, which in turn maintains the tensile properties while providing adequate time for heat setting the materials. In the embodiment shown, the drive rollers 105 are driving the movement of the sheets 101a-e, and the rotation of the feed rollers 115. The tension rollers 120 are also driven at the same rate as the drive rollers 105 to stop the shrinking of the feed material during the heating process. However, as will be understood by one having skill in the art, the feed rollers 115 may be controlled by a rotational mechanical force if desired, eliminating the need for a tension roller 120 drive system.

As the oriented thermoplastic sheet 101a nears the point of lamination with sheets 101b and 101c, sheet 101a is heated on both sides by a set of pre-heaters 125. These pre-heaters 125 begin warming the outer contact surfaces of the sheet 101a in preparation for combining with sheets 101b and 101c. The respective contact surfaces of sheets 101b and 101c that will contact and combine with sheet 101a are also pre-heated. The pre-heaters 125 not only begin the warming process, but they also remove any slack that may be present in the sheets and tighten and precondition the sheets for final heating. When oriented thermoplastic is heated, it tends to contract and shrink. Thus, as the sheets are warmed, they tighten and constrict resulting in a stabilized, taught sheet prior to combination. Additionally, in some embodiments, the sheets 101a-e are pretreated with a conventional "Corona treatment" (sometimes referred to as an "air plasma" treatment) before pre-heating to improve the bonding characteristics of the sheet.

After the contact surfaces of layers 101a-c have been pre-heated, the layers are subjected to a final heater 130 that melts the outer contact surface of the layers to just above the melting point of the thermoplastic material. The final heaters 130 are operated at a higher temperature than the pre-heaters 125 because the final heaters are not merely warming the material, but melting it to a glassy, semi-liquid state. When the contact surfaces are melted, they can be combined together by bonding rollers 110 (described in greater detail below). The temperature of each heater can be varied, and the temperature depends on the material being combined. For instance, PET has a melting point of approximately 500° F. Therefore, the final heaters 130 should produce a temperature high enough to heat the surface of the given PET sheet to above 500° F. Alternatively, the pre-heaters 125 may only need to heat the PET sheet to approximately 250° F., or some other intermediate temperature, to achieve the desired result. In the embodiment shown in FIG. 1A, the heaters 125, 130 are infra-red tube heaters. As one having skill in the art will understand, however, heating at the pre-heaters 125 and final heaters 130 may be accomplished by an infra-red heater, an electromagnetic, heat source, an electric heating element, hot air, flame, microwave heat, induction plate welding, friction welding, hot blades, or any other similar heating mechanism. Further, in some embodiments, reflectors (such as gold or aluminum reflector plates) may be used to direct heat towards the lamination point (i.e. the point between the bonding rollers 110 where layers are combined) to increase the heat from the final heater 130.

Due to the heat involved when layers of oriented thermoplastic are combined, layers 101a-e that are thicker than thin film (thin film is generally less than 0.010 inch thick) are preferable because thinner layers will melt completely when heated (rather than just at the surface). Thus, thinner layers will lose orientation characteristics throughout the sheet, such as added strength, because the entire sheet will melt and contract, as opposed to merely the outer surface. Additionally, even if the orientation benefits could be retained during heating, the sheer number of thin layers that would be required for combination to make one unitary member of sufficient thickness makes using thin layers impractical.

However, thicker layers (equal to or above 0.010 inch) can present negative issues during bonding as well. First, thicker layers contract, and shrink just like thinner layers when heated. Because the layers are thicker, when they shrink they naturally exert a much larger contraction force, which makes processing these materials difficult because the materials will come loose from and bend machinery, as well as cause other problems. Second, a thicker layer can be melted completely in the same manner as a thinner layer if enough heat is supplied to the thicker layer, causing the thicker layer to lose the length, rigidity, and strength caused by orientation.

In order to address these issues, embodiments of the present invention only heat the outer contact surface of the oriented thermoplastic layers 101a-e to melt the surface into the glassy, semi-liquid state for bonding. Generally, the outer contact surface (or "melt layer") is between approximately 0.002 to 0.015 inch thick. Stated a different way, the outer contact surface comprises not more than approximately the outer 20% of the layer 101a-e, and preferably less than 10%, but this percentage can vary depending on the thickness of the layer and the temperature used. For instance, if layer 101a is 0.10 inch thick, then preferably less than the top and bottom 0.010 inch will be melted (giving a percentage of approximately 10% for each surface). Further, as will be understood, a very thick layer (for example, overall thickness of 0.30 inch) may have a melt layer that only comprises the outer 1% of the layer. As will be understood by one of skill in the art, other percentages of overall thickness are possible for determining the contact surface depending on variations in sheet materials and temperatures of heaters 125, 130. Additionally, in the embodiment shown in FIG. 1A, both the top and bottom surfaces of layer 101a are heated, but only the inner surfaces of layers 101b and 101c are heated because the outer surfaces are not bonded at this stage in the process.

Heating only the outer surface(s) of the oriented sheets 101a-e helps to solve the two issues presented by laminating thicker oriented layers (as described above). Because only the outer surface of the sheet is melted, only the outer surface attempts to contract, resulting in a lessened overall contraction force exerted by the sheet. Also, melting only the surface of a sheet creates a molten contact surface to enable lamination with other sheets, but keeps the majority of orientation within the material intact.

Still referring to FIG. 1A, once the contact surfaces of oriented thermoplastic layers 101a-c have been sufficiently heated, they are laminated together by the bonding rollers 110. These rollers exert a pressure $P_1$ upon the layers 101a-c to press the molten surfaces of the layers together to bond the surfaces, thus creating a unitary member 102 from the three layers 101a-c. The pressure $P_1$ should be sufficient to effectively press the layers 101a-c together, but it should not be so great as to push the melted material out from between the layers. While a varying range of pressures may be used to combine the layers 101a-c, a pressure $P_1$ of between about 5-75 psi is preferable for PET layers with thicknesses of approximately 0.040 inch.

Additionally, once the layers 101a-c have been heated, $P_1$ should be applied by the bonding rollers 110 almost immediately thereafter. Once an oriented thermoplastic is heated it begins to re-crystallize quickly, so the layers must be combined very soon after heating. Generally, the thermoplastic will begin to cure and re-crystallize approximately one second after heating, and thus the layers 101a-c should pass through the bonding rollers 110 within this time frame. As shown in the embodiment in FIG. 1A, the final heater 130 is located extremely close to the point of lamination between the bonding rollers 110 to ensure lamination while the contact surfaces are still melted. As one having skill in the art will understand, the maximum distance D allowable between the final heater 130 and point of lamination (shown in FIGS. 2A-2B) to ensure sufficient bonding between the layers will vary depending upon the type of thermoplastic used, the speed at which the material is moving through the lamination device 100, and the heat generated by the heaters 125, 130. However, a distance D of less than 3 inches is generally preferable when the temperature of the final heater 130 is approximately 1200° C. and the layers are moving through the continuous lamination device 100 at approximately 3 ft/min.

After the oriented sheets 101a-c have been combined to form unitary member 102, the member is cooled by ambient air during processing to cure the bonds. While cooling, the member 102 is held and driven forward by a second set of drive rollers 105. This set of drive rollers 105, just like the initial set used to stabilize and move layer 101a forward, applies a pressure $P_2$ upon the unitary member 102. This pressure $P_2$ is much greater than $P_1$, because $P_2$ serves to hold the layers 101a-e and members 102, 103 in place and restrict them from contracting when heat is added to the layers or members. Although only the outer surface of the oriented material is heated, it still exerts a significant contraction force, and thus a high pressure force $P_2$ should be used to restrict the movement and shrinking of the layers and members. The drive rollers 105 thus not only help advance the oriented layers 101a-e and members 102, 103 forward, but also prohibit the layers and members from shrinking due to heat. This shrinkage prevention further helps retain the degree of orientation of the polymer chains within the surfaces of the layers and members, and thus preserves the strength benefits within the material. Again, the value of $P_2$ will vary as a function of the material used for the oriented layers 101a-e, the speed of the material through the lamination device 100, and the temperatures generated by the heaters 125, 130. However a pressure of 1,000 psi or greater is preferable for $P_2$. As will be understood, a hydraulic pressure device is generally capable of producing the requisite pressure force.

Still referring to FIG. 1A, once the unitary member 102 has cooled and cured sufficiently, its outer surfaces are heated by pre-heaters 125 and final heaters 130 in the same manner as sheet 101a was heated during the initial stages of the bonding process. Additionally the contact surfaces of oriented thermoplastic sheets 101d and 101e are heated in the same manner as sheets 101b and 101c were heated in preparation for bonding with the unitary member 102. Once heated, the sheets 101d and 101e are combined with member 102 via a second set of bonding rollers 110 to produce a thicker unitary member 103, which is subsequently cooled and cured in the same manner as member 102. Accordingly, the process shown in FIG. 1A may be repeated as many times as desired to achieve a high-strength oriented member of a certain thickness. As one having ordinary skill in the art will understand, while FIG. 1A illustrates five sheets 101a-e being laminated together, virtually any number of sheets may be combined to form a member of a desired thickness. Alternatively, as few as two sheets may be combined to achieve a very thin oriented member.

Figure 1B:
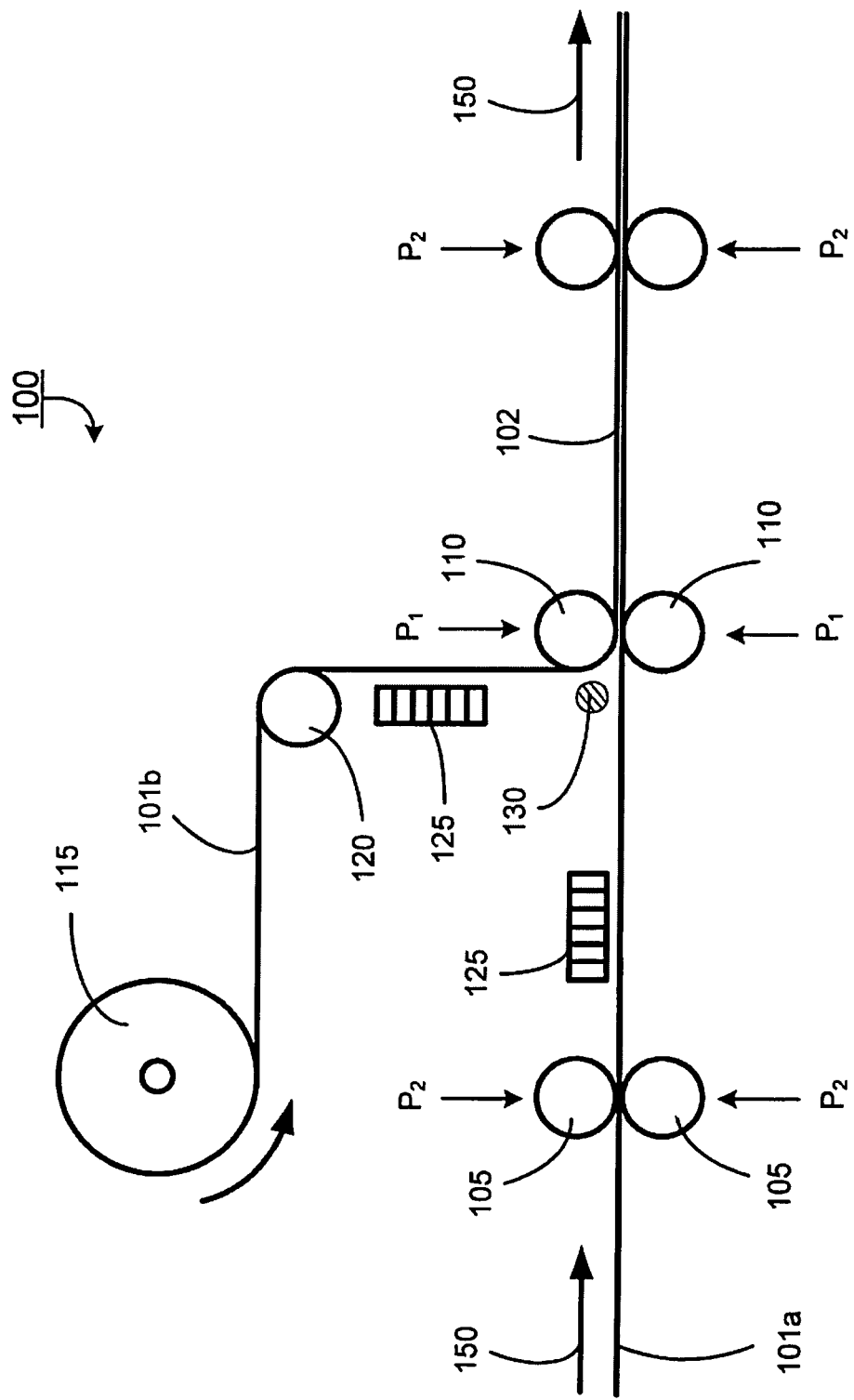

Referring now to FIG. 1B, a side view of an alternative embodiment of the continuous lamination device 100 is shown. In the embodiment shown, only two layers 101a and 101b are laminated together. However, as one having ordinary skill will understand, the process shown in FIG. 1B may be repeated as many times as desired to produce a unitary member 102 of a desired thickness. As shown, the layers 101a and 101b are progressed through the lamination device 100 and also restrained from shrinking by drive rollers 105. The drive rollers 105 shown in FIG. 1B represent a unitary roller on opposing sides of the oriented polymer sheet 101a and resulting unitary member 102. As one having ordinary skill in the art will understand, however, more than one driver roller 105 for each drive roller set on each side of the sheet or member may be used within embodiments of the present invention.

As the two oriented thermoplastic layers 101a and 101b approach the point of combination or interface (the point of contact between bonding rollers 110), the layers 101a and 101b are heated by pre-heaters 125 and final heater 130 and combined between bonding rollers 110 in a similar manner as that shown in the embodiment in FIG. 1A. The approach angle θ (shown and discussed in relation to FIGS. 2A-2B) is larger for the embodiment shown in FIG. 1B as compared to the embodiment shown in FIG. 1A, for reasons discussed below. Once the two layers 101a and 101b are combined via the bonding rollers 110 to form a solid unitary member 102, the member is cooled by ambient air (or some other cooling mechanism) as it progresses along the path through the continuous lamination device 100 as indicated by arrows 150. Again, as the member 102 and layers of material 101a and 101b are moved through the lamination device 100 by the drive rollers 105, the member and layers are also restrained from contraction during heating by the force $P_2$ exerted by the drive rollers on the layers and member.

Figure 2A:
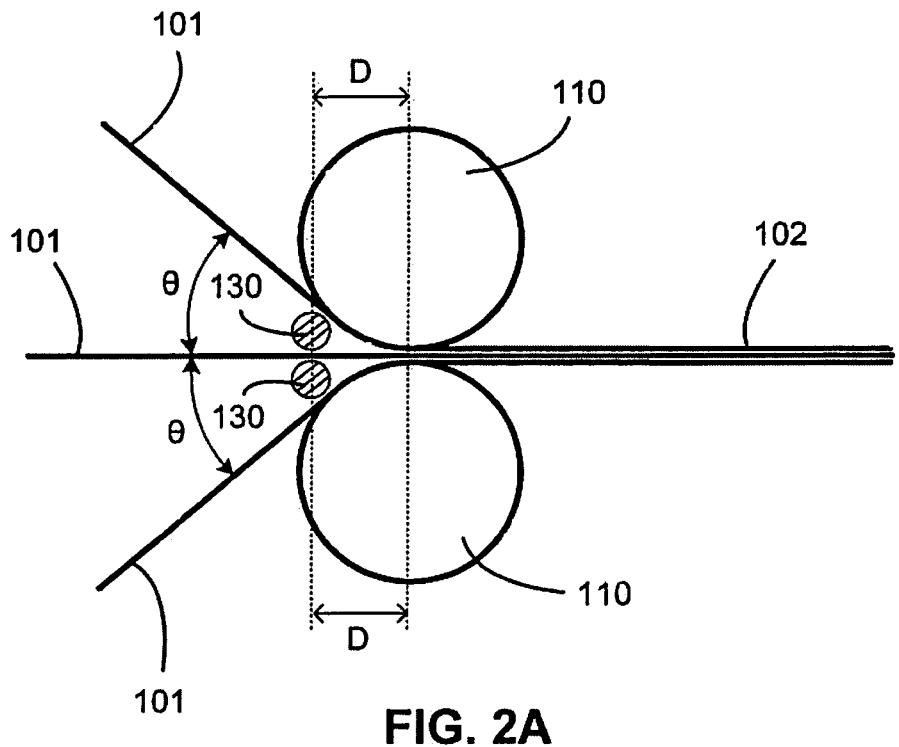
FIGS. 2A-2B are magnified side views illustrating the combination point of two or more layers of oriented thermoplastic material or secondary material between the bonding rollers according to embodiments of the present invention.
Figure 2B:
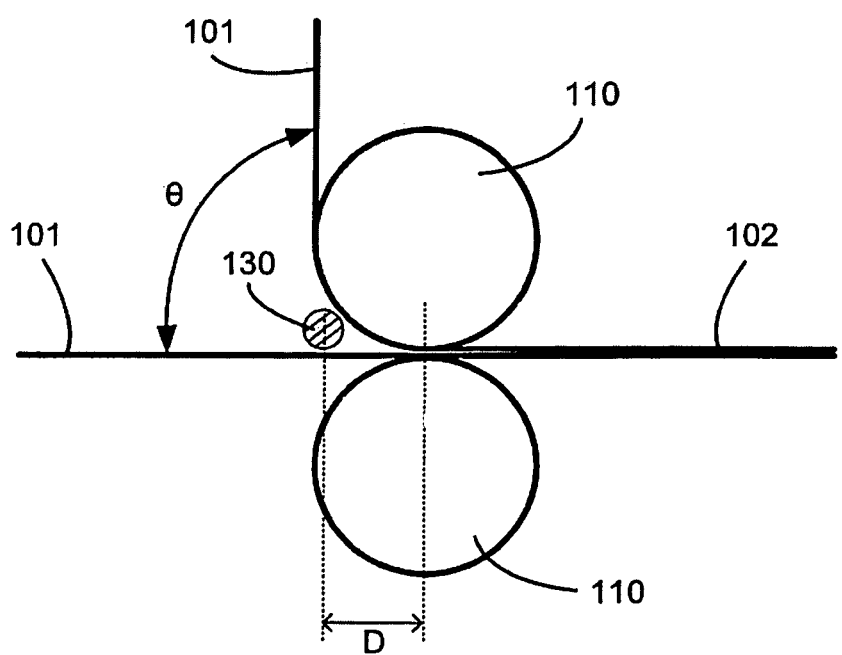

FIGS. 2A-2B are magnified side views derived from the embodiments shown in FIGS. 1A-1B, respectively, of the combination point of two or more layers of oriented thermoplastic material 101 between the bonding rollers 110. FIG. 2A demonstrates three layers 101 merging together at the bonding point, whereas FIG. 2B shows only two layers. The angle θ between the layers 101 can be varied, but generally should be within the range of about 10° to about 90°. The angle θ may be varied depending upon the thickness of the layers 101 and the size of the rollers 110. For instance, thicker layers (thickness between about 0.10 and 0.50 inch) may require a more acute approach angle θ, on the order of 10° to 20°, because thicker sheets of material 101 are naturally less flexible and more difficult to manipulate. Alternatively, thinner layers (thickness between about 0.010 and 0.10 inch) may be sufficiently laminated using an approach angle θ on the order of 30° to 90° because they are more pliable and easily bent around rollers. A larger approach angle θ is preferable in some circumstances because it allows the final heater 130 to be located at a shorter distance D from the bonding point, which in turn helps to prevent unwanted cooling before the layers 101 are laminated. As mentioned previously, because semi-crystalline thermoplastics begin to recrystallize quickly after heating, it is advantageous to place the heater 130 as close to the bonding point as possible to prevent recrystallization before the melted contact surfaces of the layers 101 are merged. Additionally, while the maximum allowable distance D between the bonding point and heaters 130 varies as a function of the speed of the material through the lamination device 100 and the type of material used, a distance D of less than or equal to 3 inches is generally preferable.

Figure 3A:
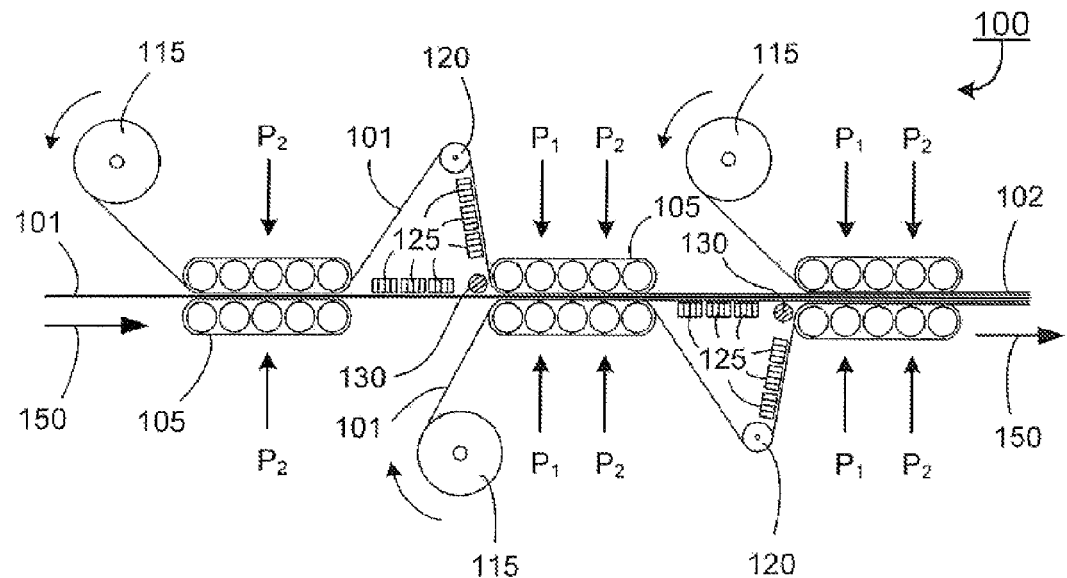
FIGS. 3A-3B show further side views of a continuous lamination device according to additional embodiments of the present invention.
Figure 3B:
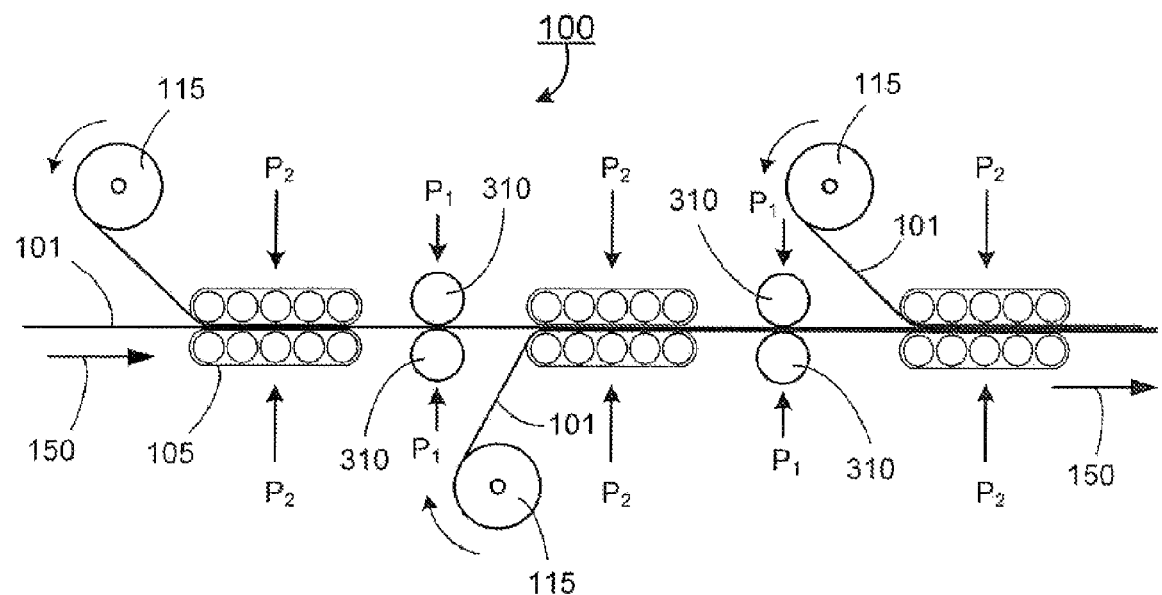

FIGS. 3A-3B are side views illustrating further embodiments of the continuous lamination device 100. In the embodiment shown in FIG. 3A, the oriented polymer sheets 101 pass under the driver rollers 105 and then back but and around a tension roller 120 before the sheets 101 are heated and laminated together. Feeding the sheets 101 under the drive rollers 105 in this fashion helps to stabilize the sheets and produce a smooth contact surface when the sheets are laminated together. This configuration effectively simplifies the embodiment shown in FIG. 1A by eliminating the need for separate tension rollers 120.

Further, as shown in FIG. 3A, there are no separate bonding rollers 110 within this embodiment. In many embodiments, the pressure exerted by the drive rollers 105 and track 108 together form flat contacting surfaces. In many embodiments, the pressure exerted by each specific drive roller 105 may be varied (i.e. if several drive rollers are used in a set, they do not all necessarily exert the same force upon the layers 101). Thus, the first roller in the drive roller set may exert a lesser force $P_1$, whereas the other rollers may exert the stronger holding force $P_2$. As one having ordinary skill in the art will understand, other forces and pressures may be used within a specific drive roller set such that the pressure varies as the material passes through each subsequent roller. Therefore, the need for separate bonding rollers 110 is eliminated by using varied pressure drive rollers 105 within some embodiments of the lamination device 100.

The embodiment illustrated in FIG. 3B incorporates ultrasonic rollers 310 to heat the contact surfaces at the interface between the layers 101. In this embodiment, an oriented thermoplastic sheet 101 is fed from a feed roller 115 into the drive rollers 105 to contact another sheet 101. At this point, the two sheets 101 are unheated and thus uncombined. The drive rollers 105 serve to move the sheets 101 forward and to restrain the sheets from shrinking during subsequent heating. After the sheets 101 have passed through the drive rollers 105, the sheets are pressed between a set of ultrasonic rollers 310. The ultrasonic rollers 310 apply pressure $P_1$ to the sheets 101 while at the same time vibrating the sheets at a high frequency to create friction between the sheets and thus melt the corresponding interface layers. Accordingly, the ultrasonic rollers 310 apply the necessary heat and pressure simultaneously to bond the two layers 101 of material. Again, just like in previous embodiments, one having ordinary skill in the art will understand that as many layers 101 can be combined as desired using the continuous lamination device 100.

Figure 4A:
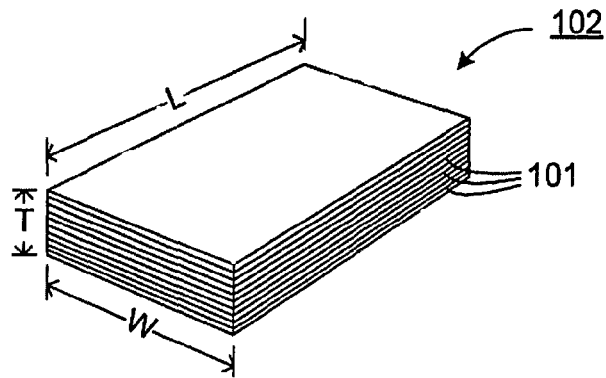
FIG. 4A is a perspective view of a rigid unitary member comprised of a plurality of layers of oriented thermoplastic or secondary material created by ah embodiment of the lamination device.

FIG. 4A illustrates a perspective view of an embodiment of a rigid unitary member 102 created by an embodiment of the lamination device 100. As shown, the member 102 has been cut transversely across its length L to form a distinct, rigid thermoplastic piece. Also, the member has thickness T created by several bonded layers of thermoplastic material 101. The member 102 includes the high-strength properties of a highly-oriented thermoplastic, but also includes a rigidity aspect created by the thickness and size of the member. As discussed previously, the member 102 is particularly well-suited for construction, load-bearing, and industrial applications requiring lightweight, high-strength, rigid materials.

Figure 4B:
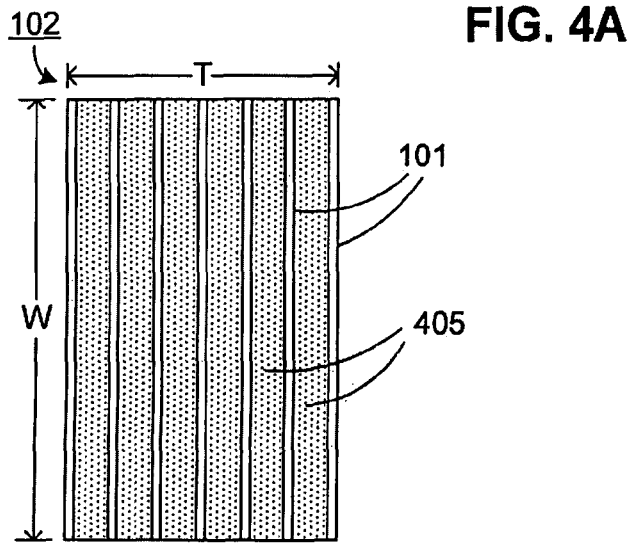
FIG. 4B illustrates a cross-sectional view of a rigid unitary member comprising alternating layers of oriented thermoplastic material and secondary material within art embodiment of the present invention.

Turning now to FIG. 4B, a cross-sectional view of a composite member 102 is shown according to one embodiment of the present invention. As mentioned previously in conjunction with FIG. 1A, the lamination device 100 is capable of combining not only layers of oriented thermoplastic materials 101, but also layers of secondary or filler materials 405. Some non-limiting examples of secondary or filler materials are polycarbonate, acrylic, acrylonitrile butadiene styrene (ABS), polyvinyl chloride (PVC), polystyrene, foams, other amorphous resins, and other similar low-density materials. Additionally, these secondary materials may be combined with wood flour, saw dust, nut shells, fibers, seeds, husks, and other similar materials to reduce the overall weight and vary the strength of the material.

The secondary layers 405 are combined with the thermoplastic layers 101 using the continuous lamination device 100 much the same way that the plurality of thermoplastic layers are combined together. The surfaces of both types of layers 101, 405 are heated, compressed, and allowed to cool. Naturally, because the secondary materials may have different melting points as compared to the thermoplastic materials, the heaters 125, 130 should be varied accordingly to heat each respective material surface to just above its respective melting point. Further, the approach angles θ may require variation depending on the flexibility and thickness of the particular secondary material.

Figure 1C:
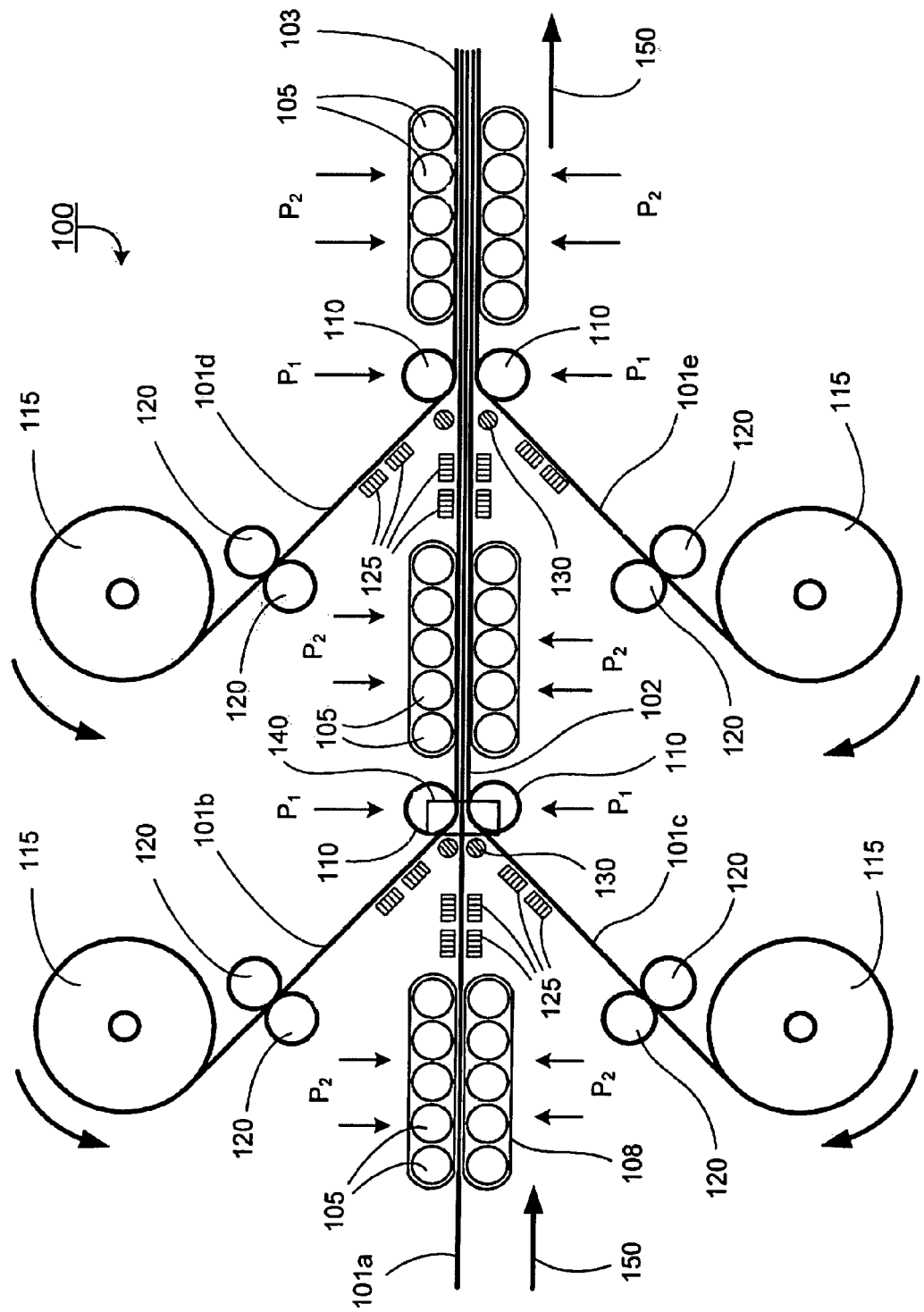

In another embodiment, illustrated in FIG. 1C, secondary layers 405 may be combined with thermoplastic layers 101 by injecting molten material through a die 140 into a gap between the outer layers 101a and 101b, and 101a and 101c, for instance. The molten material is essentially a molten form of the secondary materials discussed above, but can be any material compatible with the sheet material 101. Additionally, the molten material may be foamed to reduce the weight, if desired. Combining the secondary layers 405 and thermoplastic layers 101 in this way may be accomplished by placing an extruder and suitable die 140 after the final heaters 130, but before the bonding rollers 110, as shown in FIG. 1C. Further, although not shown, an extruder and die 140 may be placed at every point of bonding, and not merely at the first bonding point along the line in the continuous lamination device 100.

Moreover, the secondary layers 405 may be combined to the thermoplastic layers 101 by use of a solvent rather than heat. This generally requires the primary semi-crystalline material layer 101 to include a coextruded layer of amorphous material on both sides of the layer 101 prior to orientation. Non-limiting examples of solvents that may be used are Methylene Chloride, Methyl Ethyl Ketone (MEK), or Acetone. Generally, the secondary material should be an amorphous polymer, such as acrylic or polycarbonate, to react appropriately with the solvent. Layers of thermoplastic material 101 cannot be combined with other layers of thermoplastic material using a solvent because the solvent will not react with the material (thus, the need for heat). However, amorphous polymers will react with the solvent and subsequently interact with the thermoplastic to create a bond.

Referring again to FIG. 4B, the oriented thermoplastic layers 101 are shown as alternating with the layers of secondary material 405. While the layers here are shown as alternating, one of skill in the art will understand that the layers do not necessarily have to alternate, but may be combined in any variation desired. Generally, the purpose of bonding a secondary material to the thermoplastic material is to reduce the weight of the overall member 102. Some applications require extremely light members, and thus even though a member comprised entirely of thermoplastic is lighter than steel, for instance, it may not be light enough for the particular application. Accordingly, a low-density secondary material is used in conjunction with the thermoplastic material to vary the weight of the member. Typically, there will be some loss in overall strength and rigidity by incorporating secondary materials into the member because the secondary materials generally do not have the same strength and rigidity characteristics of oriented thermoplastic. However, because each layer of oriented thermoplastic is so strong, even when secondary materials are used to supplant some layers of thermoplastic 101 the resulting member 102 is often sufficiently strong and rigid for many applications.

Figure 4C:
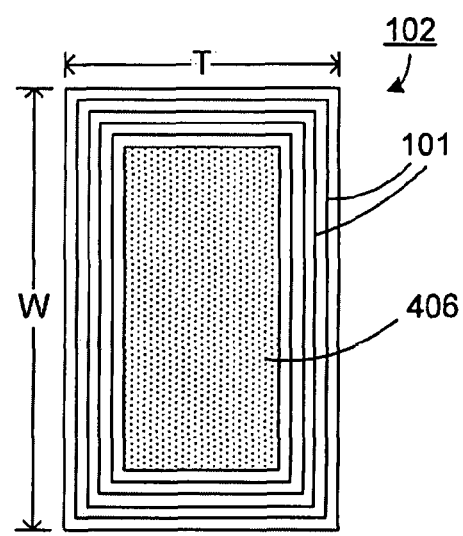
FIG. 4C is a cross-sectional view of a rigid unitary member including a core of secondary material wrapped in layers of oriented thermoplastic material according to an embodiment of the present invention.

FIG. 4C illustrates a cross-section of a rigid unitary member 102 including layers of oriented thermoplastic 101 wrapped around a core of secondary material 406. This member 102 may be created in several ways. In a first process, a singular sheet of thermoplastic material 102 is wrapped around the core 406 in a continuous fashion, similar to wrapping material around a spool. The contact surfaces between the layers 101 are heated and bonded (in a similar fashion to the embodiment described in FIG. 1A) as the layers are continuously wrapped on top of each other. The layers 101 should be restrained using high pressure via a drive roller 105 or some other mechanism to prevent unwanted shrinkage of the material. In another process, separate layers or sleeves of oriented polymer 101 are enveloped around the core material 406 to achieve a desired thickness T and width W. At this stage, the layers 101 are not welded together. Subsequently, the entire member is heated via an oven, hot air, or some other heating mechanism, to shrink the layers 101 down upon each other and the core material 406. The amount of heat used should be sufficient to shrink the layers (cause them to constrict), but low enough to prevent the layers from thoroughly melting, and losing molecular orientation. Additionally, to produce the member 102 shown in FIG. 4C, the layers of thermoplastic material 101 should be biaxially oriented (width and lengthwise) to achieve appropriate shrink properties around the perimeter of the core while at the same time retaining sufficient strength characteristics in the lengthwise direction. Further, as will be understood by one having ordinary skill in the art, while a rectangular shape is shown in FIG. 4C for the core material, other geometries are possible within embodiments of the present invention.

Figure 4D:
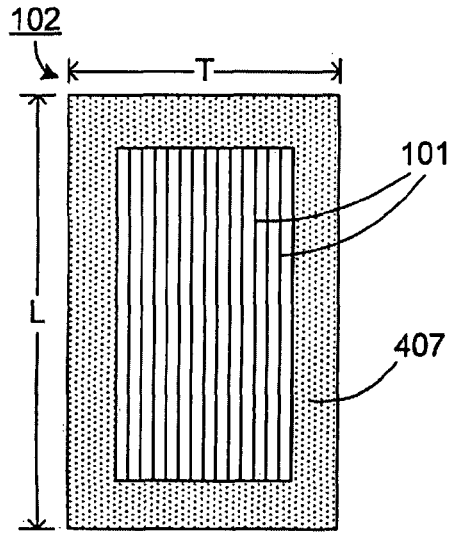
FIG. 4D shows a cross-sectional view of a rigid unitary member including layers of oriented thermoplastic material encased in an overmolded jacket according to an embodiment of the present invention.
Figure 4E:
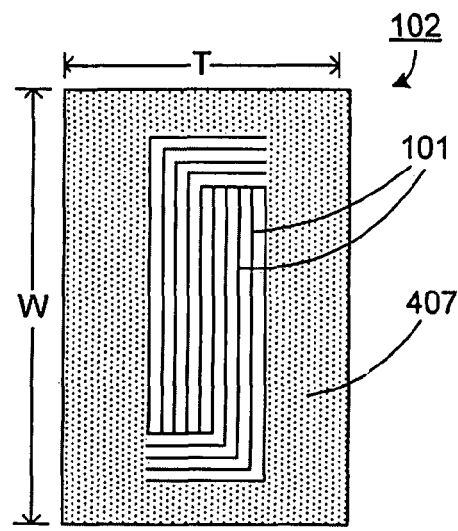
FIG. 4E is a cross-sectional view of a rigid unitary member with an overmolded jacket encasing opposing L-shaped oriented thermoplastic layers according to an embodiment of the present invention.

FIGS. 4D-4E are cross-sectional views of rigid members 102 with oriented polymer layer 101 cores encased in jackets or skins 407. FIG. 4D is essentially the member 102 shown in FIG. 4A but with an overmolded jacket 407. Non-limiting examples of materials that may be used for ah outer jacket or skin are polyethylene, polypropylene, PET, PVC, or other similar materials. The overmolded jacket may simply be slid over the thermoplastic layer member and held in place by friction, or it may be glued with an adhesive to the inner member, or it may be heated and applied to the inner member in a shrink-wrap fashion. Because the rigid thermoplastic member is so rigid, it can be difficult to nail, drill, etc. into the member. Thus, the outer skin or jacket 407 enables nailing, drilling, etc. into the unified member 102. Further, the outer jacket 407 can protect the inner thermoplastic member from excessive heat or other conditions. Additionally, the outer jacket 407 may be manufactured to look like wood or some other color to provide aesthetic benefit to the member 102. As will be understood by one having ordinary skill in the art, a jacket or skin may encase any of the cross-sections shown in FIGS. 4B-4E, as well as any other cross-sections contemplated within embodiments of the present invention.

FIG. 4E is a cross-section of a rigid member 102 with an overmolded jacket 407 encapsulating opposing L-shaped oriented thermoplastic layer configurations. To create the L-shaped configurations, oriented polymer layers are welded together using the lamination device 100, and then bent by a mechanical device at a particular point in the rigid member 102 to create a bend in the member. This configuration is held together by an overmolded jacket 407. The strength of this embodiment can be further enhanced by adding holes or perforations in each L-shaped piece prior to overmolding. Positioning the layers 101 in this L-shape enables added strength in the thickness and lengthwise directions because there is orientation in both directions.

Figure 5A:
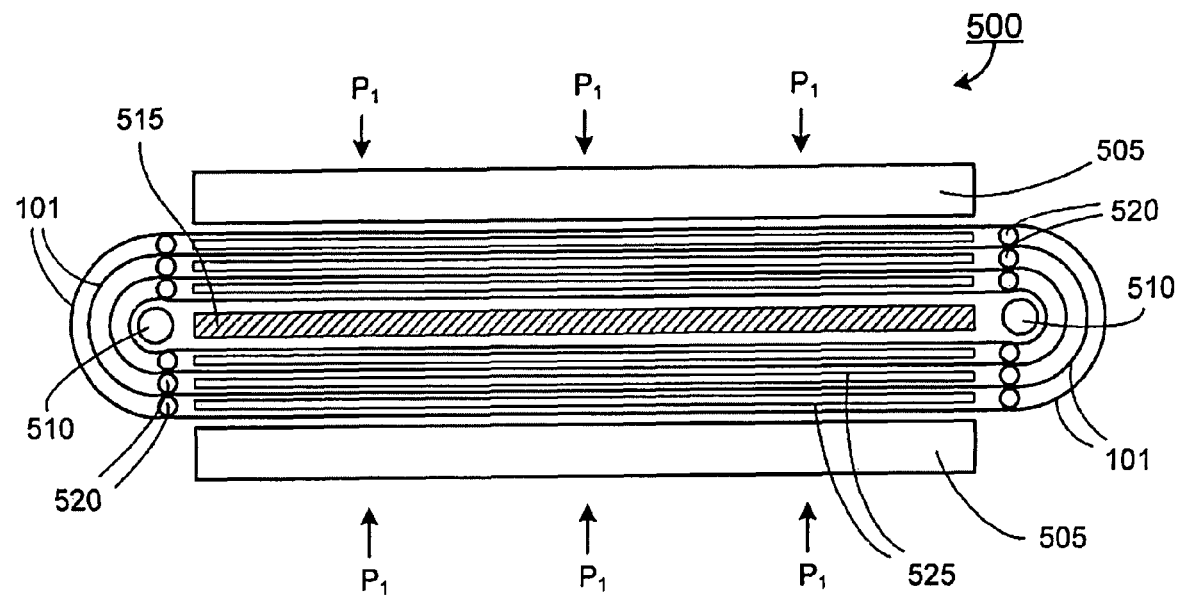
FIG. 5A is a side view of a stationary lamination device for combining a plurality of layers of oriented thermoplastic or secondary material to form a solid, unitary member according to embodiments of the present invention
Figure 5B:
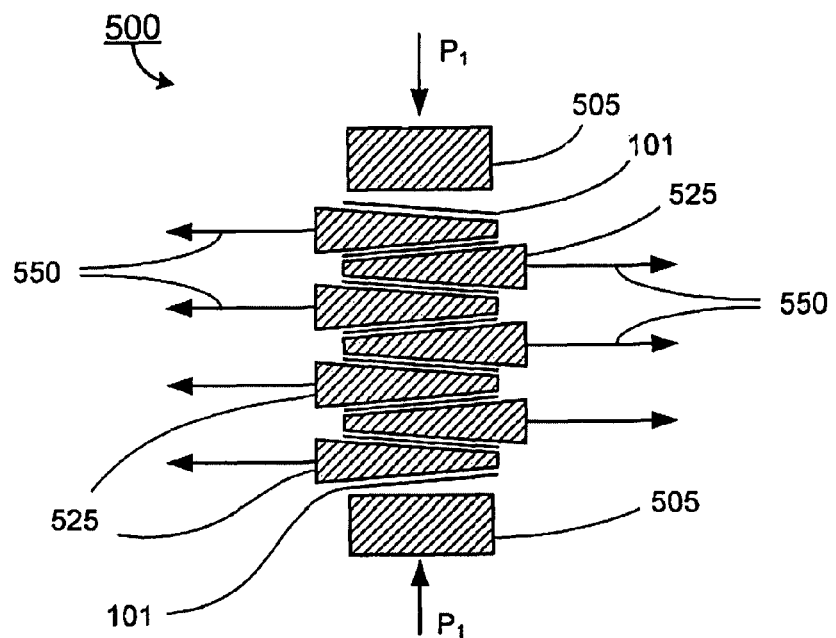
FIG. 5B illustrates a cross-sectional front view of a stationary lamination device according to one embodiment of the present invention.

Turning now to FIGS. 5A-5B, a stationary lamination device 500 is shown according to an embodiment, of the present invention. This stationary lamination device 500 combines several layers of oriented plastic material 101 or secondary material in a similar manner as the lamination device 100 shown in FIGS. 1A-3B. The stationary lamination device 500, however, does not continuously laminate long layers or sheets of material, but instead is a smaller, compact device for laminating discrete pieces of material.

FIG. 5A illustrates a side view of the stationary lamination device 500 according to one embodiment of the present invention. As shown, the stationary lamination device 500 includes clamps 505, fixed points 510, a press plate 515, spacers 520, and heating elements 525. In the embodiment shown, a plurality of oriented thermoplastic straps 101 are wrapped around the fixed points 510 to create an obround shape. While only four straps 101 are shown in FIG. 5A, the number of straps included may be varied. First, the straps 101 are wrapped around the fixed points 510. Because the straps 101 will attempt to restrict and contract when heated, it is important that the fixed points are rigid and capable of holding the straps in place during lamination. Once the straps 101 are securely wrapped around the fixed points 510, spacers 520 are inserted between the straps adjacent to the fixed points to create space between the layers. The space created by the spacers 520 enables a heating element 525 to be inserted between the layers 101 in the open space. After the layers 101 and spacers 520 have been secured, heating elements 525 are slid between the layers to melt the contact surfaces of the layers. Just as with the continuous lamination device 100, only the outer contact surfaces of the layers should be melted. Additionally, while the heating elements shown in FIGS. 5A-5B are "hot blades", as one of ordinary skill in the art will understand, the heating elements may be friction welding devices, platens, lasers, infrared bulbs, or any other capable heating mechanism.

Still referring to FIG. 5A, once the interface surfaces of the oriented polymer layers 101 have been sufficiently heated, the heating elements 525 are removed from between the layers. Immediately after removal, the clamps 505 are pressed against the layers 101 to laminate them together. Again, the polymer material will begin to recrystallize quickly after heating, so the clamps 505 should press the layers together immediately (i.e. within 1 second) after the heating elements 525 are removed. In some embodiments, for example when the heating element 525 is a hot blade, it is advantageous to apply pressure $P_1$ during heating to permit the simultaneous removal of the blades while applying $P_1$ to enable a sufficient bond between the layers 101. Additionally, the same force $P_1$ that was applied by the bonding rollers 110 in the continuous lamination device 100 should be applied during processing in the stationary lamination device 500. As the layers 101 are pressed inward by the clamps 505, an opposing force is exerted outward upon the layers by the press plate 515. In the embodiment shown, the press plate 515 is a rigid, fixed element. Use of the press plate 515 allows two discrete rigid unitary members 102 to be created during processing, as opposed to just one. As one having skill in the art will understand, however, the press plate 515 need not necessarily be used if only one, thicker member is desired (as shown in FIG. 5B). After the clamps 505 have pressed and combined the layers 101, the resulting two rigid member are allowed to cool, and then subsequently cut from the fixed points with a saw or other cutting device to achieve the final product unitary member 102. Additionally, although only oriented polymer layers were discussed in regards to the stationary lamination device 500 shown in FIG. 5A, one having ordinary skill in the art will understand that secondary materials can be used with the stationary lamination device just as with the continuous lamination device to produce members 102 of varying cross-sections.

FIG. 5B shows a cross-sectional front view of the stationary lamination device 500 without the press plate 515. As shown, the heating elements 525 are removed from between the layers 101 as indicated by arrows 550 after the layers have been sufficiently heated, then, a compression force $P_1$ is applied to bond the layers together. Because there is no press plate 515 in this embodiment, the clamps 505 will push against each other (with the oriented layers in between). Also, the resulting rigid member 102 will have a greater thickness because there is no separation caused by the press plate 515.

According to another embodiment, the oriented layers 101 are perforated and wrapped around the fixed points 510 as such that the holes of each layer are aligned. The layers 101 are then slightly heated (via an oven, hot air, or other heating mechanism) to cause the layers to constrict and tighten. Once taught around the fixed points 510, molten thermoplastic material is injected between the layers 101 so that it surrounds and fuses the layers. After the combination of layers and molten material is allowed to cool, the resulting rigid member is cut from the fixed points 510 and is ready for further use.

Figure 6:
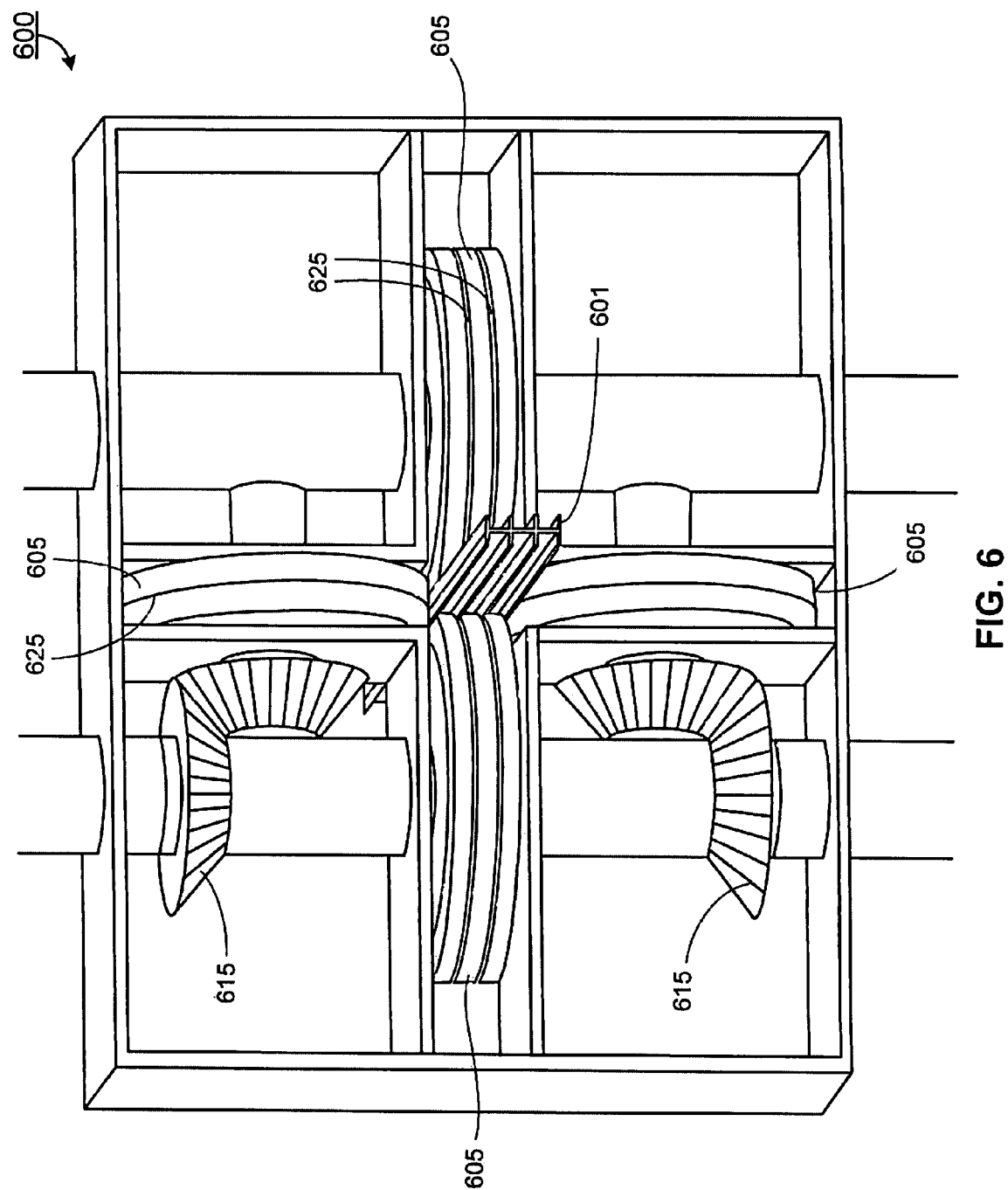
FIG. 6 is a perspective view of an orientation die for molecularly orienting thermoplastic materials with large cross-sectional areas or profiles according to an embodiment of the present invention.

According to an alternative embodiment, an orientation device or die 600 for molecularly orienting thermoplastic materials with large cross-sections or profiles is illustrated in FIG. 6. The embodiment of the orientation die 600 shown in FIG. 6 includes compression rollers 605, a drive shaft 610, and frustoconical gears 615. Initially, a length of thermoplastic material 601 with a particular profile or cross-section is extruded via a conventional extrusion device. The size of the cross-section of the material can vary, but any thickness greater than 0.250 inch should be considered "large". Once extruded, the length of material 601 passes through several orientation dies 600. Although only one die 600 is shown in FIG. 6, one having ordinary skill in the art will understand that multiple dies 600 are preferable to fully orient the polymer chains within the thermoplastic material.

Before the length of polymer material 601 passes through the first die 600 in the orientation process, the material is heated to a temperature below the melting point to enable easier stretching of the material. However, the length of material 601 should not be heated above its melting point because it will melt and become unusable. Additionally, the material 601 should remain heated during the orientation process until it is cooled at the end of the process. This heating may be accomplished by operating the orientation process in a large oven, or by blowing hot air onto the length of material 601, or by some other similar heating mechanism. Once heated, the length of material is pulled through a first die 600 by the compression rollers 605. In the embodiment shown in FIG. 6, the compression rollers are turned by the frustoconical gears 615, which are in turn driven by the drive shaft 610. Because the strength of the polymer chains in a material with a large cross section is so strong, a large force should be exerted by the drive shaft 610 to sufficiently stretch and orient the material 601. While the preferable amount of force can vary depending upon the particular material, a force adequate to deform the material 601 at an elevated temperature close to Tg for the material is preferred. For PET, for example, the compressive strength of the material at room temperature is approximately 300,000 psi. Therefore, at Tg (about 160° F. for PET), the compressive force needed to adequately deform the draw material 601 is slightly lower, in the range of about 150,000 to 250,000 psi.

As the length of material 601 is pulled through the orientation dies 600, the material is compressed on all sides by the compression rollers 605. Additionally, each subsequent orientation die 600 should operate at a moderately faster speed than the previous die. Also, each subsequent die 600 should comprise a moderately smaller cross-sectional area between the compression rollers 605, such that as the rollers spin faster and force the material 601 through a smaller cross-section, the material is pulled and stretched to orient and lengthen the polymer chains within the thermoplastic material. In essence, each previous die 600 in the process is restraining the thermoplastic material 601 such that the subsequent, faster-spinning, smaller compression rollers stretch and draw the material. Once the polymer material is sufficiently oriented, it is cooled at a final die, where it hardens. After hardening, the material is cut into sections for further use. Just like the polymer layer members 102 created by the lamination devices 100, 500, the final product oriented polymer material 601 has excellent strength and rigidity characteristics, and is thus particularly well-suited for applications requiring high-strength, lightweight members.

Figure 7A:
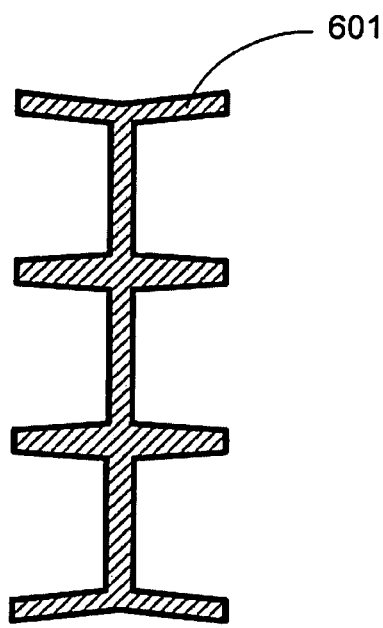
FIG. 7A is a cross-sectional view of an I-beam shape created by an embodiment of the orientation die.
Figure 7B:
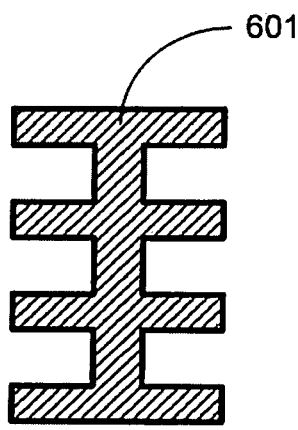
FIG. 7B illustrates a cross-sectional view of an alternative I-beam shape created by an embodiment of the orientation die.
Figure 7C:
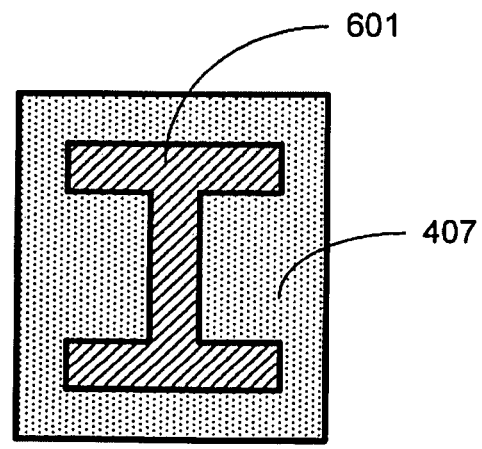
FIG. 7C illustrates a cross-sectional view of an alternative I-beam shape encased by an overmolded jacket according to an embodiment of the present invention.

Still referring to FIG. 6, the cross-sectional shape of the material 601 is illustrated in the embodiment shown as an I-beam type shape. This I-beam shape is more clearly shown in the cross-sectional view in FIG. 7A, as an alternative shape in FIG. 7B, and as an alternative shape with an overmolded jacket in FIG. 7C. The grooves 625 in the compression rollers 605 create the particular shape of the profile being oriented. Thus, the shape shown in FIG. 7A most closely resembles the shape produced by the embodiment of the orientation die 600 shown in FIG. 6. Also, while an I-beam shape is shown in FIGS. 6-7C, one having ordinary skill in the art will understand that virtually any shape may be oriented by the orientation die 600 depending on the shape and size of the compression rollers 605. As an example, the L-shaped thermoplastic layer configurations of FIG. 4E could be oriented as one solid member via the orientation die 600, rather than the bent, layered thermoplastic sheets shown in the figure.

Still another embodiment contemplated within embodiments of the present invention is the use of a singular oriented thermoplastic strap 101 (or very few laminated thermoplastic straps) to pull or contract various items by heating the strap. Preferably, a pyrotechnic heating element, such as gun powder, may be used to coat the strap 101. Once coated, the strap may be wrapped around something that requires constriction or pulling. For instance, a bundle of sticks could be wrapped with the strap. Subsequently, the pyrotechnic element is ignited, causing heating throughout the strap, which causes the orientation of the strap to constrict, thus bundling the sticks. Or, the strap 101 could be used in a winch fashion to pull a piece of machinery by the constriction force exerted upon shrinkage of the strap during heating. Further, although a pyrotechnic element would serve to heat the entire strap simultaneously, any of the previously-mentioned heating mechanisms could be used to heat the strap.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for bonding together two or more layers of oriented semi-crystalline thermoplastic to form a rigid unitary member, comprising the steps of:
   restraining the two or more layers of oriented semi-crystalline thermoplastic along at least one orientation axis of the layers of oriented semi-crystalline thermoplastic to prevent shrinkage of the material during processing;
   heating only each respective contact surface of the two or more restrained layers of oriented semi-crystalline thermoplastic to a temperature greater than the melting point of the oriented semi-crystalline thermoplastic, wherein the heating is accomplished via a localized heat source that is in immediate proximity to a merge point at which the two or more restrained layers of oriented semi-crystalline thermoplastic are merged together, wherein the heating via the localized heat source heats only each respective contact surface of the two or more layers;
   merging together the heated contact surfaces of the two or more layers of oriented semi-crystalline thermoplastic at the merge point; and
   applying pressure to the merged contact surfaces of the two or more layers of oriented semi-crystalline thermoplastic using at least two flat contact surfaces to combine the two or more layers of oriented semi-crystalline thermoplastic to form the rigid unitary member wherein the flat contact surfaces exert a pressure that is greater than a pressure applied at the point of merging together the heated contact surfaces.

2. The method of claim 1, wherein each contact surface comprises the outer 0.012 inch or less of the thickness of each layer of oriented semi-crystalline thermoplastic.

3. The method of claim 1, wherein each contact surface comprises the outer 20% or less of the thickness of each layer of oriented semi-crystalline thermoplastic.

4. The method of claim 1, wherein the thickness of each layer of oriented semi-crystalline thermoplastic is greater than or equal to 0.010 inch.

5. The method of claim 1, wherein the oriented semi-crystalline thermoplastic: comprises polyethylene terephthalate (PET).

6. The method of claim 1, wherein the oriented semi-crystalline thermoplastic is combined with a wood filler to form a wood-filled composite.

7. The method of claim 1, wherein the pressure applied to the merged contact surfaces is between about 5 and 75 psi.

8. The method of claim 1, further comprising the step of pretreating each respective contact surface of the two or more restrained layers of oriented semi-crystalline thermoplastic with a corona or plasma treatment before the contact surfaces are heated.

9. The method of claim 1, wherein each respective contact surface melts to a semi-liquid state during heating.

10. The method of claim 1, wherein the respective contact surfaces are merged immediately after heating before the surfaces begin to recrystallize.

11. The method of claim 1, further comprising the step of cooling the merged contact surfaces by a cooling agent, wherein the cooling agent is selected from the group comprising ambient air, water, refrigeration, and cryogenics.

12. The method of claim 1, further comprising the step of encasing the rigid unitary member in a protective jacket.

13. The method of claim 12, wherein the protective jacket comprises a material selected from the group comprising: polyethylene, polypropylene (PP), and PET.

14. The method of claim 13, wherein the jacket material is combined with a filler material selected from the group comprising: flame retardant, wood, blowing agent, glass, ultraviolet additives, and color additives.

15. The method of claim 1, wherein the localized heat source is positioned at a distance of 3 inches or less from the merge point.

16. The method of claim 1, wherein the localized heat source is in physical contact with the contact surfaces of the two or more restrained layers of oriented semi-crystalline thermoplastic.

17. The method of claim 1, wherein the step of heating only each respective contact surface of the two or more restrained layers of oriented semi-crystalline thermoplastic comprises heating each respective contact surface via one or more hot blades that are in physical contact with each respective contact surface.

18. The method of claim 1, wherein the localized heat source is selected from the group comprising: an infra-red heater, an electromagnetic heat source, hot air, microwave heat, induction plate welding, friction welding, hot blades, an electric heat component, lasers, flame.

19. The method of claim 1, wherein the flat contact surfaces have a surface area greater than the contact surface area of nip rollers.

* * * * *